United States Patent [19]
Tonsi et al.

[11] Patent Number: 5,286,183
[45] Date of Patent: Feb. 15, 1994

[54] EXTRUDER HEAD FOR APPLYING COATINGS OF POLYMERIC MATERIAL TO SEMIFINISHED PRODUCTS OF ELONGATED CYLINDRICAL CONFORMATION

[75] Inventors: Lodovico Tonsi, Sesto S. Giovanni; Giovanni Pozzati, Olgiate Olona, both of Italy

[73] Assignee: Pirelli Cavi S.p.A., Milan, Italy

[21] Appl. No.: 880,742

[22] Filed: May 8, 1992

[30] Foreign Application Priority Data

May 13, 1991 [IT] Italy .................. MI91A 001296

[51] Int. Cl.⁵ .............. B29C 47/02; B29C 47/22; B29C 47/24; B29C 47/92
[52] U.S. Cl. .................. 425/113; 425/133.1; 425/141; 425/150; 425/171; 425/382.3; 425/466
[58] Field of Search ......... 425/141, 113, 133.1, 425/466, 467, 114, 192 R, 462, 171, 150, 382.3; 264/40.1

[56] References Cited

U.S. PATENT DOCUMENTS

| | | | |
|---|---|---|---|
| 3,382,539 | 5/1968 | Zehs | 425/466 |
| 3,601,851 | 8/1971 | Heidinger | 425/466 |
| 3,923,439 | 12/1975 | Isley et al. | 425/466 |
| 4,137,745 | 2/1979 | Muratov et al. | 425/466 |
| 4,464,104 | 8/1984 | Greuss | 425/141 |
| 4,525,131 | 6/1985 | Hauser, Jr. | 425/114 |

FOREIGN PATENT DOCUMENTS

| | | | |
|---|---|---|---|
| 557897 | 6/1957 | Belgium | 425/113 |
| 1222363 | 6/1987 | Canada | |
| 075809 | 9/1982 | European Pat. Off. | |
| 948625 | 2/1957 | Fed. Rep. of Germany | |
| 1107926 | 5/1961 | Fed. Rep. of Germany | |
| 1948580 | 4/1970 | Fed. Rep. of Germany | 425/466 |
| 3619005 | 12/1987 | Fed. Rep. of Germany | |
| 53-15547 | 5/1978 | Japan | 425/467 |
| 808283 | 2/1959 | United Kingdom | 425/113 |
| 2160654 | 6/1985 | United Kingdom | |

OTHER PUBLICATIONS

Patent Abstracts of Japan vol. 4, No. 176 (M-45) (658 Dec. 5, 1980).

*Primary Examiner*—Khanh P. Nguyen
*Attorney, Agent, or Firm*—Brooks Haidt Haffner & Delahunty

[57] ABSTRACT

An extruder head has an inner die member (5) housed in a supporting body (2) and provided with a central duct (6) continuously passed through by a semifinished product (7). An outer die member (9) exhibits a shaped housing (10) defining, in cooperation with the inner die member (5), an outflow port (11) for the mixture to be applied to the semifinished product (7). The shaped housing (10) is defined in a centering element (12) rotatably housed, according to an oblique and incident axis relative to the axis of the central duct (6), within an intermediate collar (13) rotating in the supporting body (2) in coaxial relation with the central duct itself. By rotating the centering element (12), the outflow port (11) moves from a centered position to a maximum-eccentricity position with respect to the central duct (6). The rotation of the intermediate collar (13) modifies the orientation of the common plane containing the axes of the outflow port (11) and central duct (6).

16 Claims, 4 Drawing Sheets

EXTRUDER HEAD FOR APPLYING COATINGS OF POLYMERIC MATERIAL TO SEMIFINISHED PRODUCTS OF ELONGATED CYLINDRICAL CONFORMATION

Field of the Invention

The present invention relates to an extruder head for applying coating mixtures to semifinished products of elongated cylindrical conformation.

In greater detail, the present invention is concerned with an extruder head for extruders of the type used for example for coating electric conductors with insulating material and in general coating any continuously fed article of cylindrical form with elastomeric or thermoplastic material.

Related Art

Electrical conductors, either in the form of individual wires or of multiwired cables, must be coated with polymeric, thermoplastic or elastomeric materials such as PVC, EPR and the like, adapted to perform electric insulating functions and/or protection functions.

The application of these coatings is carried out by continuous extrusion, with the aid of extruder heads exhibiting a central duct along which there is the passage of the wire or the cable being worked which is then coated with the mixture in the plastic state coming from an outflow port of annular form substantially coaxial with the central duct. In greater detail, the extruder head comprises a female mould and a male mould housed in a fixed supporting body, which at the outlet define the annular outflow port through which the material flows thereby covering the semifinished product coming out of the central duct provided in the male mould.

In most cases the coating applied to the semifinished product is required to be coaxial with the semifinished product. In other words, the coating must have a substantially constant thickness. For the purpose it is necessary to previously calculate the delivery sections of the mixture along the path travelled by it for reaching the outflow port, so as to have a constant and regular material delivery over the whole section of the outflow port.

It has however been found that as a result of different factors that cannot be either foreseen or quantified, the possibility arises that the coating applied to the semifinished product will not be perfectly coaxial with the semifinished product.

By way of example, some of the factors that can originate the undesired eccentricity of the coating are represented by possible temperature differences in different regions of the moulds, differences in the path really travelled by the polymeric material for reaching the annular port, in combination with rheologic features of the material being used, and others.

For example, since the polymeric materials in the plastic state always have a degree of elasticity, it results that when by effect of the above factors the coating material encounters various resistances to its moving forward along the path travelled for reaching and going past the outflow port, it undergoes several local elastic compressions that are given back in the form of expansions at the outlet from the outflow port for the formation of the coating layer.

In order to eliminate these problems, the product coming from the extruder head is submitted to targeted quality controls aiming at checking the homogeneity in thickness of the applied coating mixture. In greater detail, these quality controls can be carried out both periodically by cutting the product in order to check the geometrical and size features of the coating, and continuously by means of appropriate non-destructive sensors capable of identifying possible thickness differences in the coating by directly acting on the outside of the product being worked, downstream of the extruder head.

Should an eccentricity of the coating applied to the conductor be detected following said controls, it is possible to intervene by causing the outflow port of the material from the extruder head to be offset relative to the central duct passed through by the semifinished product, so as to compensate for the found anomaly as far as the coating is brought to coaxiality conditions.

For the purpose in the known art provision is made for adjusting the outflow port eccentricity by different technical solutions.

According to one of these solutions the female mould is substantially held in place by a plurality of circumferentially-distributed adjusting screws, generally in the number of four, acting radially between the supporting body and the female mould. By acting on said adjusting screws the positioning of the female mould relative to the male mould can be modified by displacing the female mould according to a plane perpendicular to the central duct axis, as far as a the outflow port defined between the moulds is given a certain degree of eccentricity capable of neutralising the eccentricity that would be otherwise produced on the applied coating.

According to another known technical solution, the male mould is essentially linked to the supporting body by a ball joint in concentric relation with the central duct. Adjusting screws enable the male mould to be swung around the rotational centre defined by the ball joint, so as to geometrically modify the outflow port as previously said.

SUMMARY OF THE INVENTION

In accordance with the present invention it has been found that by forming the shaped housing of the female mould, or outer die member, with a centering element rotating according to an oblique and incident axis relative to the axis of the central duct, it is possible to geometrically modify the outflow port depending upon requirements, by rotating the centering element without giving rise to the formation, along the extruded-material travel, of discontinuities and/or obstructions to the flow to such an extend that stagnations or slowing downs of the material within the extruder head may occur.

In particular, in accordance with the invention an extruder head is provided for applying a coating of polymeric material to semifinished products of elongated cylindrical conformation comprising a fixed supporting body; a male mould, or inner die member, fastened to the inside of the supporting body, having a tapered end portion substantially of truncated conical form and a central duct susceptible of being longitudinally passed through by a continuously-infed cylindrical semifinished product emerging from the end of said end portion of the male mould; connecting means for connection to an extruder, designed to feed at least a polymeric material in the plastic state into a hollow feed gap formed between the supporting body and the male mould; at least a female mould, or outer die member, provided with a shaped housing disposed around the end portion of the male mould, defining, in cooperation therewith, a passage channel for said material, said channel communicating with the feed gap and forming an annular outflow port at the opposite end thereof, through which a layer of material is applied to the semifinished product, characterized in that the female mould comprises at least a centering element exhibiting one hole of truncated conical form at least partly defining said shaped housing, and defines said outflow port at the end thereof, said centering element being designed to rotate according to an oblique and incident axis relative to the axis of said central duct so as to bring the outflow port to a position to be selected, between a centered position and a maximum-eccentricity position relative to said central duct.

In greater detail, the first hole of truncated conical form exhibited by the centering element has an oblique axis relative to the rotational axis of the centering element itself forming an angle equal to the angle of incidence of the centering element axis on the central duct axis.

In a preferred embodiment said female mould in addition comprises an intermediate collar rotatably carrying said centering element, said intermediate collar being in turn engaged to the supporting body in a rotating manner in coaxial relation with the central duct for arranging an eccentricity plane containing the axes of the central duct and the outflow port in the desired orientation.

In particular said intermediate collar exhibits a second hole of truncated conical form, coaxial with the central duct, partly defining said shaped housing and extending in a continuity relationship between the hollow feed gap and the first hole of truncated conical form formed in the centering element.

Preferably the displacement of the outflow port from the centering position to the maximum-eccentricity position corresponds to an angular rotation through 180° of the centering element about its own axis of rotation.

In a particular embodiment of the extruder head of the invention the maximum eccentricity of the outflow port relative to the axis of the central duct is at least equal to 20% of the thickness of said layer of material applied to the semifinished product.

Preferably the angle of incidence of the rotational axis of the centering element to the axis of the central duct is in the range of 1° to 5°.

In a preferred embodiment reading means is provided between the centering element and the intermediate collar for identifying the rotational axis of the centering element relative to the intermediate collar and, in connection therewith, the eccentricity value of the outflow port relative to the axis of the central duct and the orientation of the eccentricity plane containing the axes of the outflow port and the central duct, with respect to the body.

In particular said reading means comprises one series of indices and a second series of indices reproduced on the centering element and the intermediate collar respectively and circumferentially distributed following an increasing order in respectively opposite directions, according to respective arcs of circumferences of angular amplitude equal to half the angular travel of the centering element corresponding to the displacement of the outflow port from the centered position to the maximum eccentricity position, each index of the first series being arranged to be selectively brought into register with a corresponding index belonging to the second series in order to indicate the value of said eccentricity.

In keeping with one aspect of the invention, the alignment position of the corresponding indices of the first and second series identifies the orientation of said plane of eccentricity.

Preferably formed between the intermediate collar and the supporting body is auxiliary reading means adapted to indicate the angular orientation of the collar itself relative to said supporting body.

In particular said auxiliary reading means comprises at least a goniometric scale reproduced on the supporting body and at least a reference index reproduced on the intermediate collar.

In a preferred embodiment the extruder head of the invention comprises remote control actuator means, operatively connected to said centering element through respective driving means designed to cause an angular rotation of the latter, of amplitude to be established in advance, about its own axis.

In a further preferred embodiment the extruder head comprises remote control actuator means operatively connected to said intermediate collar through respective driving means adapted to cause an angular rotation of the latter of amplitude to be established in advance.

In keeping with another aspect of the invention the extruder head comprises first and second actuator means acting on the centering element and intermediate collar respectively through respective driving means operatively connected to detection and control means for establishing the thickness of the mixture layer applied to the semifinished product, located downstream of the outflow port and adapted to operate said first and second actuator means in order to cause respective angular rotations of the centering element and intermediate collar about their respective axes of rotation, correspondingly to the thickness eccentricity values of the mixture layer and to the lying of said eccentricity detected by the control means itself.

BRIEF DESCRIPTION OF THE DRAWINGS

Further features and advantages of the invention will become more apparent from the following detailed description given with reference to the accompanying drawings, in which.

DESCRIPTION OF PREFERRED EMBODIMENTS

Referring to the drawings, an extruder head for applying coating mixtures to semifinished products of elongated cylindrical configuration in accordance with the present invention has been generally identified by reference numeral 1.

The extruder head conventionally comprises a supporting body 2 of substantially cylindrical configuration, fastened to an extruder 3 (FIG. 3) which in known manner is designed to work one or more components previously introduced into a charging hopper 4, so as to obtain a mixture of polymeric material in the plastic state which is injected into the extruder head 1.

Coaxially fastened to the supporting body 2 of the extruder head 1 is a male mould 5 longitudinally passed through by a central duct 6 along which a semifinished product 7 is worked.

In greater detail, the semifinished product 7 consisting for example of an electric conductor, a wire, a cord, a cable or another article of substantially cylindrical configuration, is continuously infed by means not shown as known per se and not of importance to the ends of the invention, so that it emerges from the central duct 6 at an outlet end 5a of the male mould 5 substantially of truncated conical form.

Formed between the male mould 5 and the supporting body 2 is a hollow feed gap into which the above mixture in a plastic state is introduced through means not shown as known per se and conventional connecting the gap to the extruder 3. The mixture being constantly pushed since it is acted upon by the extruder 3, continuously flows towards the outlet end 5a of the male mould 5.

Also housed in the supporting body 2 is at least a female mould 9 conformed such as to form a shaped housing 10 disposed about the outlet end 5a of the male mould 5 in order to define, together with the outlet end itself, an outflow port 11 for the mixture. This outflow port 11 therefore communicates with the hollow feed gap 8 and surrounds the semifinished product 7 emerging from the male mould 5.

The mixture coming from the feed gap 8 will be therefore applied in the form of a continuous layer 7a to the semifinished product 7 emerging from the male mould 5.

In accordance with the invention the female mould 9 comprises at least a centering element 12 provided with a first hole of truncated conical form 12a defining the outflow port 11 and at least part of the shaped housing 10. The centering element 12 can rotate according to an oblique and incident axis "y" through an angle "a" of predetermined amplitude, relative to the axis of the first frustoconical hole 12a and to the axis "x" of the central duct 6, and therefore of the semifinished product 7.

The first frustoconical hole 12a is made so as to be coaxial with the central duct 6 at a predetermined rotational position of the centering element 12.

In greater detail, the geometric shape of the first frustoconical hole 12a is substantially defined by a frustum of cone of oblique axis relative to the rotational axis "y" of the centering element 12 and coincident with axis "x" in said predetermined position.

By virtue of the misalignment between the above axes, as a result of an angular rotation of the centering element 12 about its own rotational axis "y", a displacement of the outflow port 11 relative to the outlet end 5a of the male mould 5 is achieved.

Figure 1:
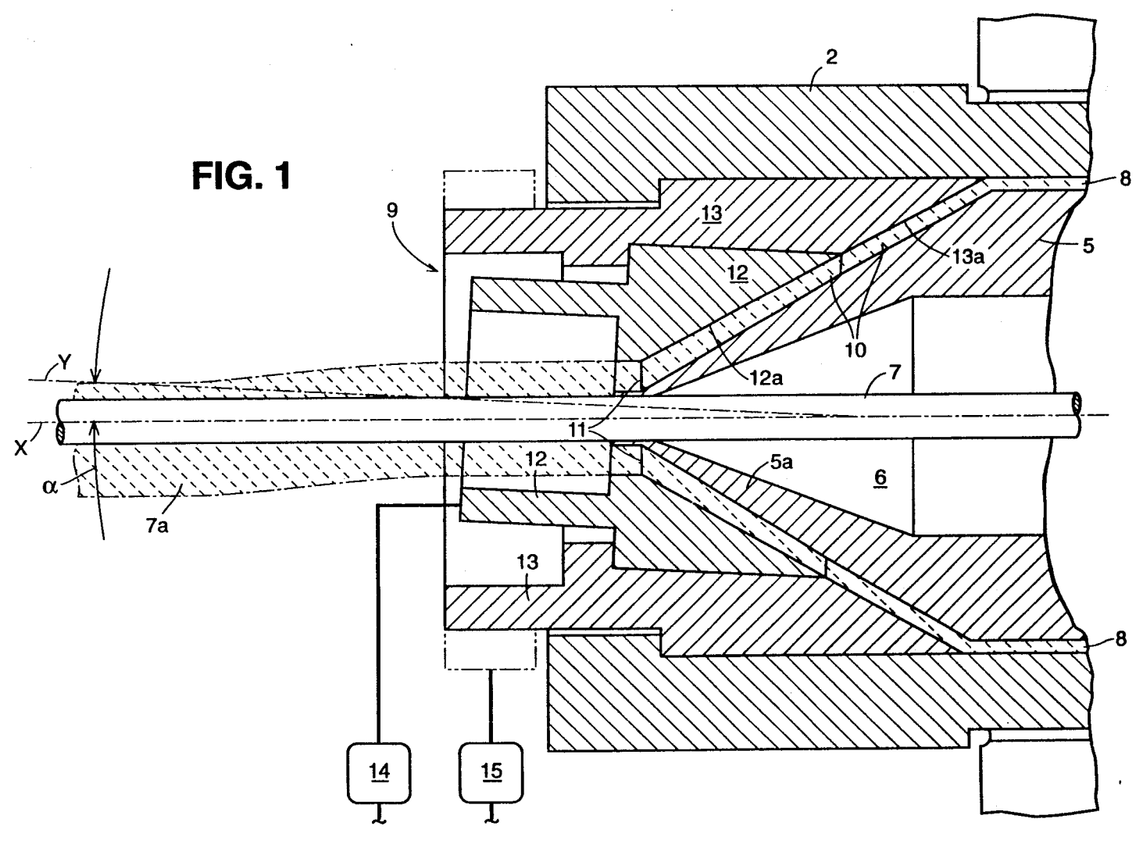
FIG. 1 is a diametrical sectional view of an extruder head in accordance with a preferred embodiment of the present invention under centering conditions of the female mould.
Figure 2:
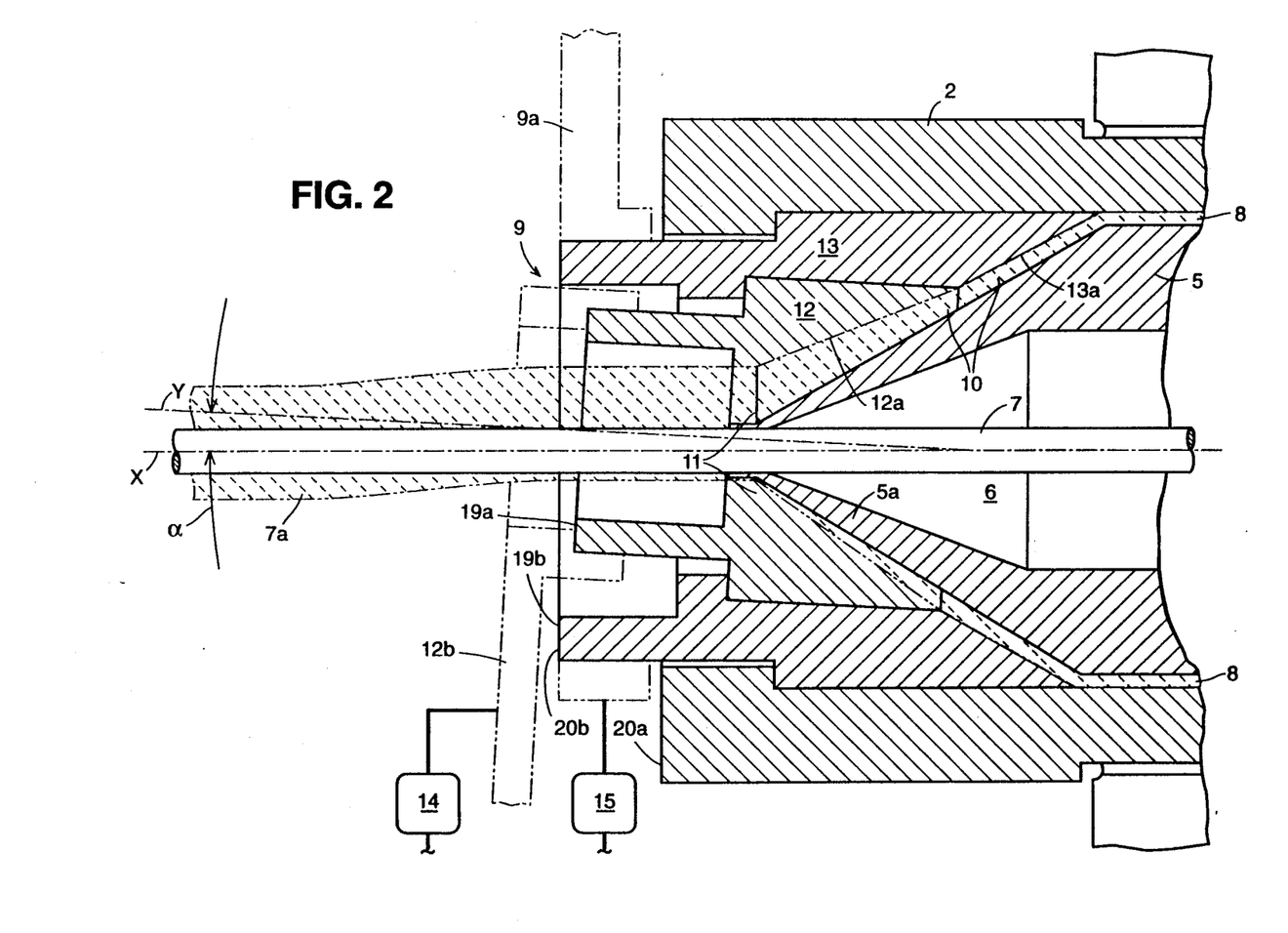
FIG. 2 is a diametrical sectional view of the extruder head of FIG. 1 under a maximum eccentricity situation of the female mould.

In particular by the angular rotation of the centering element 12 the shape of the outflow port 11 is modified from a centered configuration relative to the central duct 6, as shown in FIG. 1, to a configuration in which the duct 6 is eccentric, as shown in FIG. 2.

The angular rotation performed by the centering element 12 in order to modify the configuration of the outflow port 11 between the above mentioned two end positions conveniently equals 180°.

For rotational angles of the centering elements ranging between 0° and 180°, the outflow port 11 will take different eccentricity values included between a zero value and a maximum value, to be selectively used depending upon requirements.

The centering element 12 is mounted with no possibility of axial movement within an intermediate collar 13 in turn axially locked in the supporting body 2 and rotating in coaxial relation with the central duct 6.

The intermediate collar 13 exhibits a second hole 13a of truncated conical form, coaxial with the central duct 6 and defining part of said shaped housing 10.

The second frustoconical hole 13a substantially extends in a continuity relationship between the hollow feed gap 8 and the frustoconical hole 12a formed in the centering element 12.

This continuity relationship is substantially maintained irrespective of the positioning taken by the first frustoconical hole 12a, during the displacement of the outflow port 11 from the centered position to the maximum-eccentricity position, as clearly viewed from comparing FIGS. 1 and 2.

The above ensures that under any operating condition of the extruder head 1 the mixture will not be subjected to encountering discontinuities in its flow travel, in particular in the passage area between the collar 13 and element 12, that could give rise to localized stagnations of the mixture.

When the intermediate collar 13 is rotated within the supporting body 2, carrying along the centering element 12 therewith, the spatial orientation of the common lying plane of axes "y", "x" of the centering element and central duct 6 is modified, as well as at the same time, the orientation of the eccentricity plane containing the axes of the outflow port 11 and central duct 6.

Therefore, should for any reason an undesired unevenness in the thickness of the mixture layer 7a applied to the semifinished product 7 occur, as shown in FIG. 1, this anomaly could be corrected by imparting appropriate angular rotations to the centering element 12 and intermediate collar 13.

In particular, the centering element 12 is provided to be rotated about its axis "y" so as to give the outflow port 11 an eccentricity of predetermined value, in correlation with the eccentricity that can be undesirably exhibited by the mixture layer 7a relative to the semifinished product 7 so as to carry out the compensation thereof. Therefore, by acting on the intermediate collar 13 it is possible to bring the plane in which the desired eccentricity of the outflow port 11 has been achieved to the appropriate angular position, for example a position having opposite way with respect to the eccentricity of the mixture layer 7a, so that the last mentioned eccentricity will be neutralised on the product coming out of the extruder head 1, as shown in FIG. 2.

The rotations of the centering element 12 and intermediate collar 13 can be controlled by hand or with the aid of driving members 9a, 12b, consisting for example of lever tools diagrammatically shown in FIG. 2, adapted to be engaged with the centering element 12 and collar 13.

The manual control can be achieved with the aid of mechanical driving members engaged to the supporting body 2 and intermediate collar 13 respectively and in engagement with corresponding paired driving members carried by the intermediate collar itself and centering member 12 respectively.

These mechanical driving members for example can consist of gearing, worm screws or the like and are therefore adapted to enable the remote eccentricity adjustment.

Therefore the eccentricity adjustment can be executed manually, by identifying the occurrence of a defect in the extruded coating and, based on the manually detected data, piloting the appropriate rotations of tools 9a, 12b or the mechanical driving members adapted for the purpose.

Figure 3:
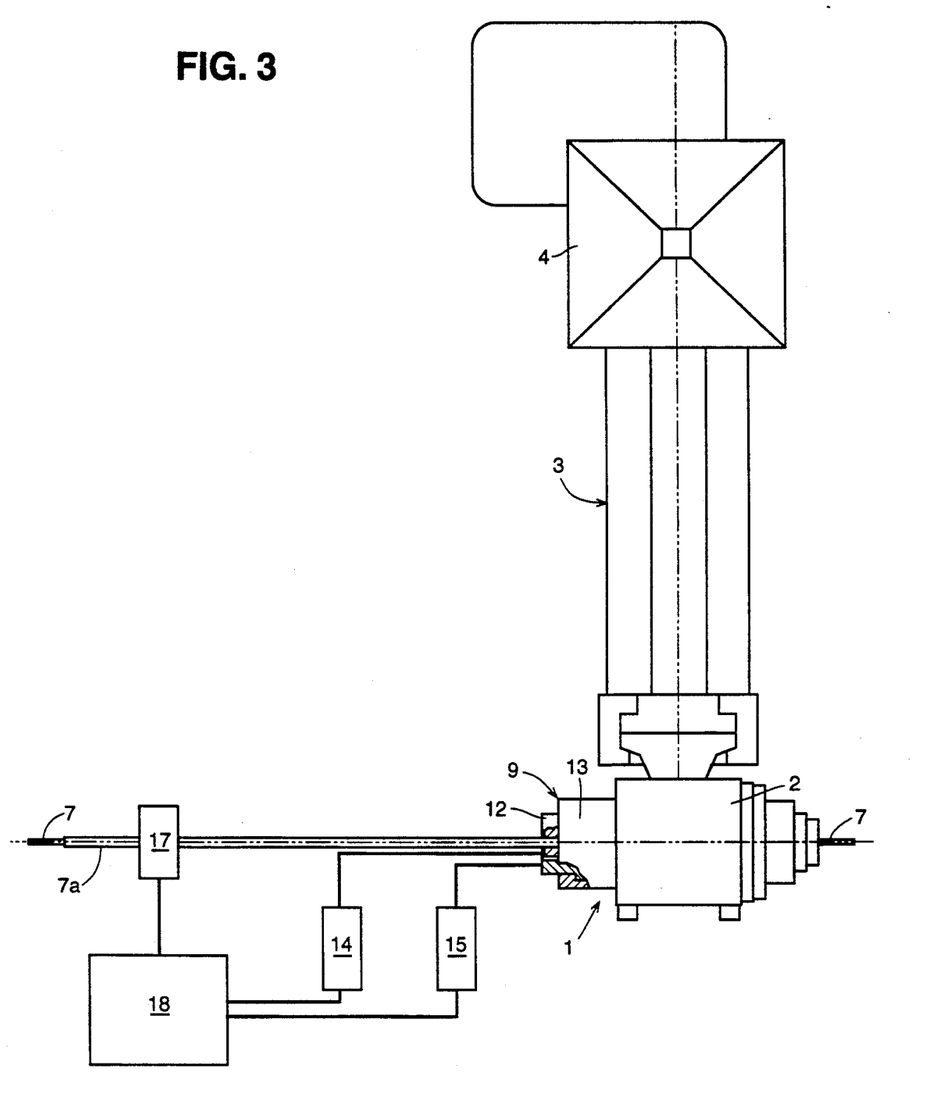
FIG. 3 is a diagrammatic top view of the extruder head shown in FIG. 1 associated with an extruder and acting operatively on a semifinished product.
Figure 4:
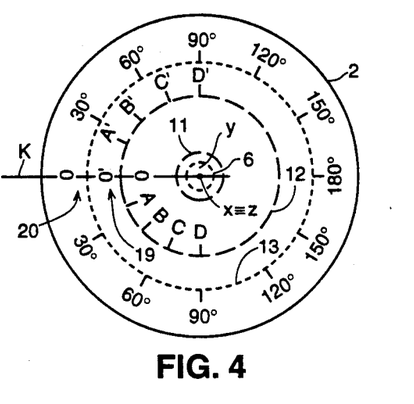
FIGS. 4 to 9 are schematic diagrams showing different work conditions taken by the female mould and reproducing reading scales for identifying the amount and orientation of the eccentricity of said female mould.
Figure 5:
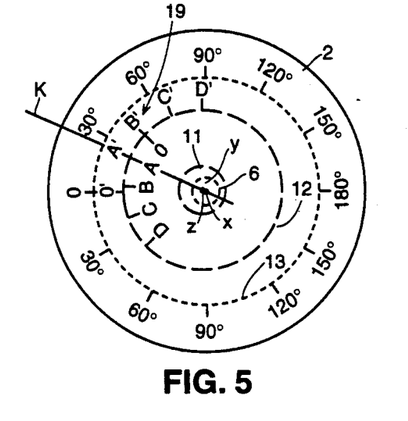
Figure 6:
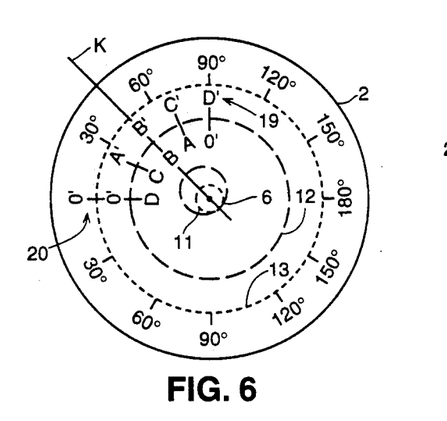
Figure 7:
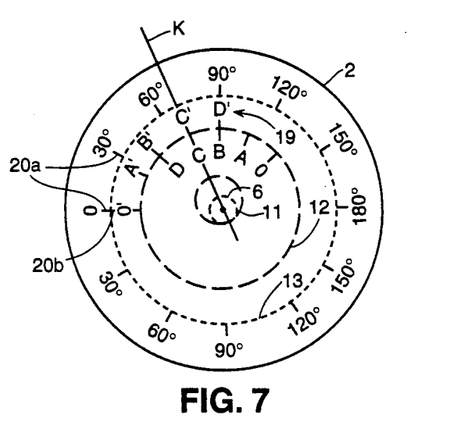
Figure 8:
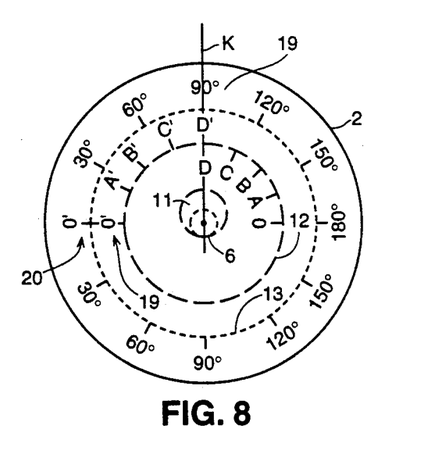
Figure 9:
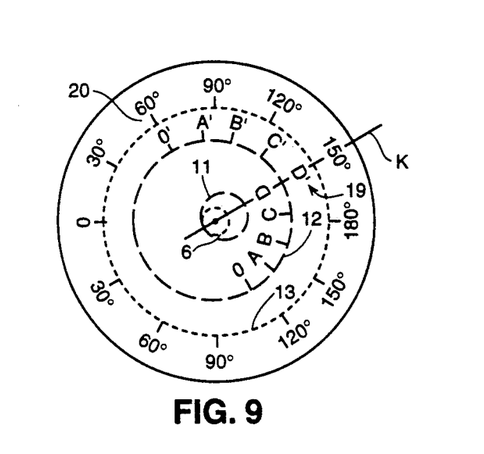

Referring particularly to FIG. 3, it is also provided that the rotation of the centering element 12 and intermediate collar 13 should be governed by first and second actuator means 14, 15 consisting for example of servomotors adapted to move said mechanical driving members, causing the desired rotations.

Said actuator means 14, 15 can be driven either directly or automatically through control means 17 acting on the product being worked downstream of the extruder head 1, with reference to the advancing direction of the semifinished product 7.

More particularly the control means 17, through respective sensing members not described or shown as known and conventional, continuously detects the thickness of the coating mixture 7a applied to the semifinished product 7.

An electronic control box 18 receives the signals coming from the control means 17 and causes the operation of the actuator means 14, 15 so as to modify the eccentricity of the outflow port 11 by the angular rotation consequently imparted to the centering element 12 and/or the intermediate collar 13, in order to correct the anomaly found in the product being worked.

As shown by way of example in FIGS. 4 to 9, in order to facilitate the manual adjustment or enable the automatic adjustment to be duly checked, provision may be also made for reading means 19 to be disposed between the centering element 12 and the intermediate collar 13, which will enable the immediate identification of the eccentricity of the outflow port 11 relative to the axis "x" of the central duct 6, as well as the orientation of the eccentricity plane containing the axes "z" "x" of the outflow port and central duct.

This reading means 19 comprises one series of indices 19a, denoted by O, A, B, C, D, reproduced on the centering element 12, and a second series of indices 19b denoted by O', A', B', C', D', formed on the intermediate collar 13. A given eccentricity value of the outflow port 11 corresponds to each of the indices of the first series O, A, B, C, D, and second series O', A', B', C', D', individually correlated with each other.

In this connection it is to be noted that letters A, B, C, D, A', B', C', D' can be replaced with the real eccentricity values corresponding to them, expressed under metric or percent form.

Indices of the first series O, A, B, C, D and second series O', A', B', C', D' are shown in an increasing order in respectively opposite directions and according to respective arcs of circumferences spaced apart by the same distance on an angular amplitude equal to half the angular travel carried out by the centering element 12 for bringing the outflow port 11 from the centered position to the maximum-eccentricity position.

In this way a rotation according to which the last symbol of the first series is disposed in front of the last symbol of the second series corresponds to a complete angular travel of element 12.

Should different angular travels be desired due to different requirements, it will be possible to correspondingly make the respective indication scales. When one of the indices of the first series, for example index B, is brought into coincidence with the corresponding index B' (FIG. 6) being part of the second series, a given eccentricity value of the outflow port 11 is created which can be numerically reproduced on said coincident indices.

In addition, with this geometry the plane in which indices B, B' belonging to the first and second series respectively, in coincidence with each other, have been disposed is advantageously also coincident with the plane in which the eccentricity containing axis "z" of the outflow port 11 and axis "x" of the central duct 6 has been determined.

Therefore the mutually coincident indices also show the orientation of this eccentricity plane, according to the representation given in FIGS. 4 to 9 (dotted lines "k").

The presence of auxiliary reading means 20 can also be provided. Said means is formed between the supporting body 2 and the intermediate collar 13 and is designed to point out the angular orientation of the collar relative to said supporting body constituting a fixed reference.

This auxiliary reading means 20 comprises a goniometric scale 20a circumferentially reproduced on the supporting body 2 and one or more read indices 20b reproduced on the intermediate collar 13.

It is to be noted that for the sake of clarity in the graphic representation, angle "α" in FIGS. 1 and 2 and the consequent maximum eccentricity value of the outflow port 11 have been deliberately raised.

In a practical preferred embodiment given by way of example, for coating an electric cable of a 10 mm diameter with a 2.5 mm thick layer of mixture, the rotational axis "y" of the centering element has been provided to be incident on axis "x" of the central duct 6 in the transition plane between the first and second frustoconical holes 12a, 13a, according to an angle "α" of about 2°, in order to give the outflow port 11 a maximum eccentricity of 2 mm.

At all events, the maximum eccentricity to be given to the outflow port 11 is preferably provided to be at least equal to 20% of the thickness of the mixture layer 7a to be applied to the semifinished product, and angle "α" is provided to have a value included between 1° and 5°.

Values of angle "α" lower than the stated range could require too great a length value of the female mould 9. On the other hand, values of angle "α" higher than stated could involve, under some angular positions, important deflections to the mixture flow between the surfaces of hole 13a and hole 12a.

Within the scope of the present invention in case of extruders providing for the covering of the semifinished product with several mixture layers, it is also possible to adopt one or more additional female moulds adapted for separately forming said layers.

Each of said additional moulds is comprised of a centering element and an intermediate collar in the same manner as above described so that the eccentricity of all mixture layers applied to the semifinished product can be corrected.

The extruder head in question enables the geometrical conformation of the mixture layer or layers to be adjusted in a practical and precise manner, while keeping a particularly simple mechanical structure.

Advantageously, unlike the case of known devices having a female mould movable in a plane perpendicular to the axis of the central duct, the present invention enables the conformation of the female mould to be suitably modified without involving the formation of sharp localized deflections in the path travelled by the mixture, which would bring about, as a result, undesired stagnation or slowing-down areas in the material flow.

These slowing-down or stagnation areas must be avoided as much as possible, since they could give rise to the formation of small clots above all when materials that can be cross-linked or at all events materials susceptible of alternation under the effect of a prolonged heating are used. Said clots, when subsequently conveyed into the mixture flow, would give origin to unacceptable irregularities in the coating applied to the semifinished product that, in particular in the case of insulating coatings for electrical cables, could result in an undesired decay of the dielectric characteristics of the material.

The rotation of element 12 within collar 13, on the contrary, only causes a slight variation of the surface inclination in the transition area between surface 13a and surface 12a to occur on varying the eccentricity, which variation does not affect the behaviour of the material flow.

It is also to be pointed out that, unlike the known art and in particular unlike the solutions in which the female mould is designed to swing about a ball joint, the extruder head in question keeps a very simple structure, adapted to be easily dismantled for servicing purposes and for carrying out the control and/or replacement of the components thereof and that it lends itself both to a remote control and to an automatic control of the eccentricity, during the production.

Obviously modifications and variations can be made to the invention as conceived, all of them falling within the scope of the inventive idea.

We claim:

1. In an extruder head for applying a coating of a flowable material to the outer surface of an elongated semifinished product to form a product having a circular cross-section, said extruder head comprising:

a fixed supporting body;

an inner die member fastened to said supporting body, said inner die member having a frusto-conical outer surface extending around a predetermined first axis, said frusto-conical outer surface having first predetermined diameter at a first end of said inner die member and a smaller second diameter at a second opposite end of said inner die member, and said inner die member also having an inner duct co-axial with said axis and extending from said first end to said second end of said inner die member for the passage therethrough of said elongated product; and an outer die member mounted on said body and encircling said inner die member, said outer die member having a frusto-conical inner surface portion spaced from and encircling said outer surface of said inner die member to form a channel between said outer surface of said inner die member and said inner surface of said outer die member for the passage of said flowable material from said first end of said inner die member to said second end of said inner die member, said inner surface of said outer die member having a portion spaced from and adjacent said second end of said inner die member and said outer surface of said inner die member at said second end thereof and said portion of said inner surface of said outer die member adjacent said second end of said inner die member defining an outflow port for applying said flowable material to said elongated product; wherein the improvement comprises:

a centering element rotatably mounted within said outer die member, said centering element having a frusto-conical inner surface forming at least part of, and coextensive with, said frusto-conical inner surface of said outer die member and providing said outer die inner surface portion adjacent said second end of said inner die member and said outflow port, said centering element being rotatable around a second axis which extends at an oblique angle and intersects said first axis and said second axis being selected to provide concentric inner and outer surfaces of said outer die member and said inner die member at said outflow port in one rotational position of said centering element and non-concentric inner and outer surfaces at said outflow port in other rotational positions of said centering element without causing an interruption of said inner surface of said outer die member where uniform flow of the flowable material is modified.

2. An extruder head as set forth in claim 1 wherein said outer die member further comprises an intermediate collar rotatably mounted on said supporting body and rotatably supporting said centering element, said collar being rotatable about an axis co-axial with said first axis for changing the circumferential position of said second axis with respect to said first axis.

3. An extruder head as set forth in claim 1 wherein maximum non-concentricity of said outer and inner surfaces at said outlet port is produced with rotation of said centering element by 180° from the rotational position in which said outer and inner surfaces are concentric.

4. An extruder head as set forth in claim 3 wherein the maximum non-concentricity relative to said first axis is at least equal to 20% of the radial thickness of the distance between said inner and outer surfaces defining said outflow port when such inner and outer surfaces are concentric.

5. An extruder head as set forth in claim 1 wherein said oblique angle is in the range from 1° to 5°.

6. An extruder head as set forth in claim 1 wherein the axis of said frusto-conical inner surface of said centering element is the same as said second axis.

7. An extruder head as set forth in claim 2 wherein said collar comprises a frusto-conical inner surface spaced from and extending from adjacent said first end of said inner die member to said frusto-conical surface of said centering element and coaxial with said first axis.

8. An extruder head as set forth in claim 2 further comprising reading means (19) between said centering element (12) and said collar (13) for identifying the rotational axis of the centering element (12) relative to said collar (13) whereby the non-concentricity, or eccentricity, of said inner and outer surfaces defining said outflow port (11) relative to said first axis and the orientation of a plane containing said outflow port and perpendicular to said second axis with respect to said first axis is indicated.

9. An extruder head according to claim 2 wherein formed between the said collar and the supporting body (2) is auxiliary reading means (20) adapted to indicate the angular orientation of the collar itself relative to said supporting body (2).

10. An extruder head according to claim 2 further comprising remote control actuator means (14), operatively connected to said centering element (12) through respective driving means (12b) designed to cause an angular rotation of said centering element, of amplitude to be established in advance, about said second axis (y).

11. An extruder head according to claim 2 further comprising remote control actuator means (15) operatively connected to said intermediate collar (13) through respective driving means (9a) adapted to cause an angular rotation of said collar of amplitude to be established in advance.

12. An extruder head according to claim 2 further comprising first and second actuator means (14, 15) acting on the centering element (12) and intermediate collar (13) respectively, through respective driving means (9a, 12b) operatively connected to detection and control means (17, 18) for establishing the thickness of the coating layer (7a) applied to the semifinished product (7), located downstream of the outflow port (11) and adapted to operate said first and second actuator means (14, 15) in order to cause respective angular rotations of the centering element (12) and intermediate collar (13) about their respective axes of rotation, correspondingly to thickness eccentricity values of the coating layer (7a) and to the amount of an eccentricity detected by the detection and control means itself (17).

13. An extruder head as set forth in claim 1 wherein said channel is connected to a source of polymeric material containing a polymerizing agent.

14. An extruder head as set forth in claim 1 wherein said channel is connected to a source of polymeric material.

15. An extruder head according to claim 8, wherein said reading means (19) comprises one series of indices (O, A, B, C, D) and a second series of indices (O', A', B', C', D') reproduced on the centering element (12) and the intermediate collar (13) respectively and circumferentially distributed following an increasing order in respectively opposite directions, according to respective arcs of circumferences of angular amplitude equal to half the angular travel of the centering element (12) corresponding to the displacement of the outflow port (11) from the centered position to the maximum-eccentricity position, each index of the first series being arranged to be selectively brought into register with a corresponding index belonging to the second series in order to indicate the value of said eccentricity.

16. An extruder head according to claim 15, wherein the alignment position of the corresponding indices of the first and second series identifies the orientation of said plane.

* * * * *